Patented July 21, 1925.

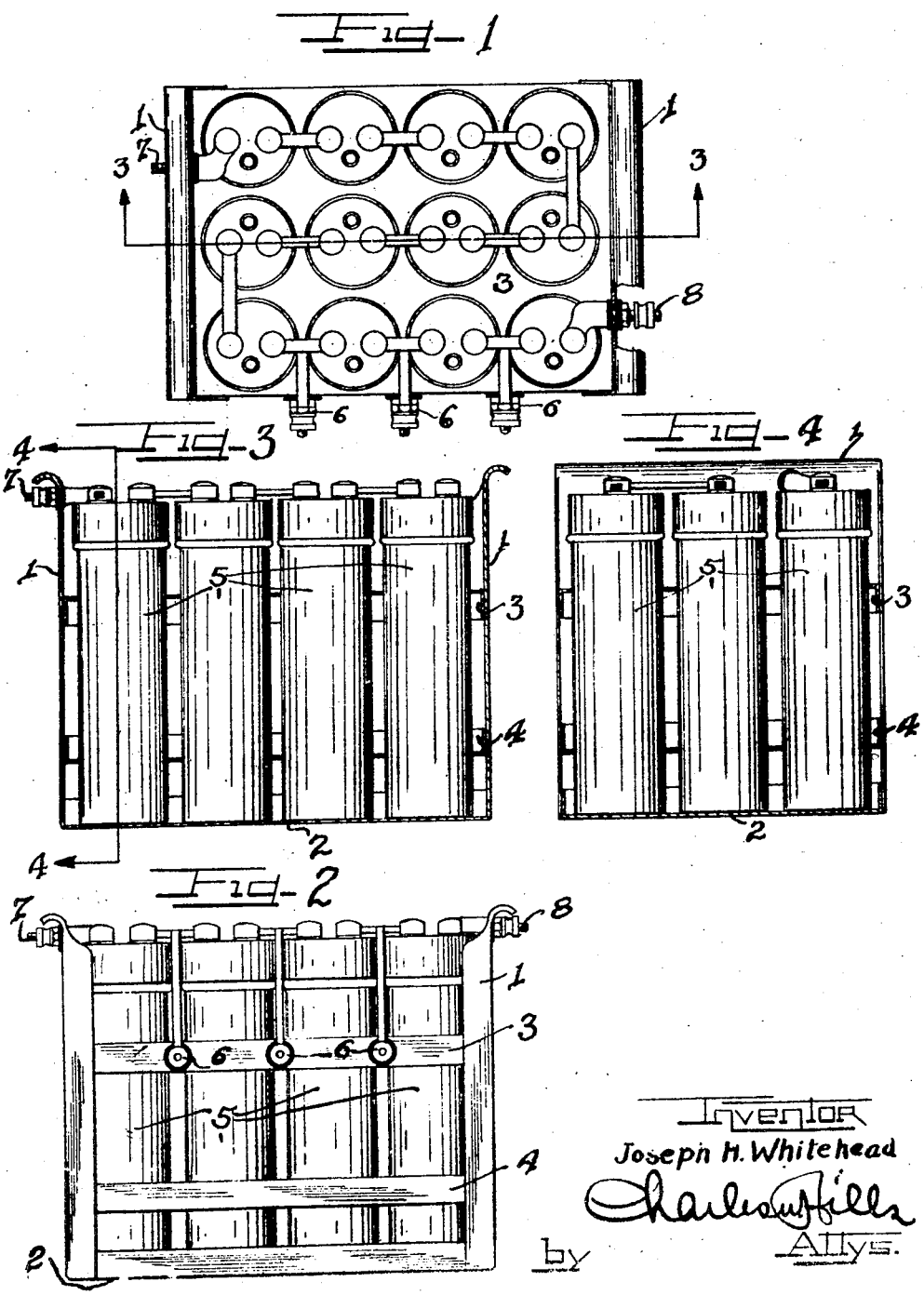

1,546,422

UNITED STATES PATENT OFFICE.

JOSEPH H. WHITEHEAD, OF CHICAGO, ILLINOIS, ASSIGNOR TO UNIVERSAL BATTERY CO., A CORPORATION OF ILLINOIS.

BATTERY CASE.

Application filed July 28, 1924. Serial No. 728,548.

*To all whom it may concern:*

Be it known that I, JOSEPH H. WHITEHEAD, a citizen of the United States, and a resident of the city of Chicago, in the county of Cook and State of Illinois, have invented certain new and useful Improvements in a Battery Case; and I do hereby declare that the following is a full, clear, and exact description of the same, reference being had to the accompanying drawings, and to the numerals of reference marked thereon, which form a part of this specification.

It has been found desirable to obtain a battery case which will meet the popular demand for cheap, compact, neat and reliable battery cases which can be used in the home. The demand is particularly great for one which will meet the requirements of a "B" battery case in a radio receiving set.

My invention relates to improvements in battery cases of the kind used for holding a plurality of small storage batteries for use as a unit; and the objects of my invention are, first, to provide an inexpensive device which is simple of manufacture; second, to provide a device which holds the batteries securely and compactly; third, to provide a device which will be acid resistive and will prevent any leakage of the electrolyte from the case; and fourth, to provide a device of this class in which the various batteries are easily accessible. Further important objects will be apparent from the dislosures in the specification and drawings.

I attain these objects by the device illustrated in the accompanying drawing in which Figure 1 is a plan view showing the batteries inserted in the case.

Figure 2 is a side elevation showing the terminals.

Figure 3 is a section on the line 3—3 of Figure 1.

Figure 4 is a section along the line 4—4 of Fig. 3.

Similar numerals refer to similar parts throughout.

The ends of the case are formed by turning up the outer portions of a single strip of metal to form the ends 1, 1 and the bottom 2 as shown in Figure 2. The ends 1, 1 are flanged at the sides as is the bottom 2. These flanges are welded where they meet near the four lower corners of the case.

The supports 3 and 4 are formed by flanging the four sides of retangular sheets and perforating the same with a plurality of holes for receiving the batteries 5. These supports are then welded to the ends of the case and the side flanges thereof as shown in Figure 3.

The flanges of the lower support 4 extend upwardly while those of the upper support 3 extend downwardly to permit a better view of the liquid in the batteries. The upper edges of the ends 1 are flanged outwardly to form supports adapted to rest on a pair of rods which coact with these flanges to hold the casing as well as be used as handles in carrying the battery from place to place. The upper support 3 for the batteries holds a plurality of terminals 6. These terminals are connected to various points in the battery circuit for cutting out one or more of the batteries. The ends of the battery circuit are connected to terminals 7 and 8 which are situated on either end of the case. The connections of the batteries with each other and the terminals form an additional means of holding the batteries rigidly in the case as shown in Figure 1. The fact that the case is made of metal makes it possible to bake upon it an acid resistive coating which would not be possible if it were made of wood.

It will be seen that due to the few parts and simplicity of construction that this case can be very easily and cheaply manufactured. Since it is made of comparatively thin sheet metal, it is not bulky, and since it can be made of metal it is more secure and reliable than if it were made of wood or similar material. It also affords a means of easily determining the quantity of liquid therein and the condition of each battery which may be readily removed. The case is acid resistive and the bottom forms a pan which holds any leakage of acid from the batteries and prevents the same coming in contact with anything outside of the casing.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A battery case comprising two ends for said case having flanges, a bottom for said case having flanges, said bottom being integral with said ends, said flanges on said bottom and said flanges on said ends being secured together near the lower corners of said ends, a plurality of battery supports having a plurality of holes therethrough adapted to receive and support storage batteries, said supports being secured to said ends for said case at the ends of said supports adjacent said ends for said case, flanges on said battery supports, said flanges being secured to said flanges on said ends for said case, all of said elements being of sheet metal.

2. A battery case comprising two ends for said case having side flanges and upper flanges, said upper flanges being adapted to engage supporting rods for said case, a bottom for said case having flanges, said bottom being secured to said ends for said case, the flanges of said bottom being secured to the side flanges on said ends for said case, a plurality of battery supports having a plurality of holes therethrough adapted to receive and support storage batteries, said supports being secured to said ends for said case at the ends of said supports adjacent said ends for said case, flanges on said battery supports, all of said elements being of sheet metal.

3. A battery case comprising two sheet metal ends for said case, a bottom integral with said ends, a plurality of battery supports having a plurality of holes therethrough adapted to receive and support storage batteries.

4. A battery case comprising two sheet metal ends for said case having flanges, a bottom for said case having flanges, said bottom being integral with said ends, said flanges on said bottom and said flanges on said ends being secured together near the lower corners of said ends, a plurality of battery supports having a plurality of holes therethrough adapted to receive and support storage batteries, said supports being secured to said ends for said case at the ends of said supports adjacent said ends for said case, flanges on said battery supports.

5. A battery case comprising two sheet metal ends, a bottom integral with said ends, a plurality of sheet metal battery supports having a plurality of holes therethrough adapted to receive and support storage batteries, a plurality of terminals situated on and insulated from one of said supports.

6. A battery case comprising two sheet metal ends for said casing having flanges, a bottom for said case having flanges, said bottom being integral with said ends, said flanges on said bottom and said flanges on said ends being secured together near the lower corners of said ends, a plurality of sheet metal battery supports having a plurality of holes therethrough adapted to receive and support storage batteries, said supports being secured to said ends for said case at the ends of said supports adjacent said ends for said case, flanges on said battery supports, said flanges being secured to said flanges on said ends for said case, a plurality of terminals situated on and insulated from one of said supports.

7. A battery case comprising two ends for said case having flanges, a bottom for said case having flanges, said bottom being integral with said ends, said flanges on said bottom and said flanges on said ends being secured together near the lower corners of said ends, a plurality of battery supports having a plurality of holes therethrough adapted to receive and support storage batteries, said supports being secured to said ends for said case at the ends of said supports adjacent said ends for said case, flanges on said battery supports, the flanges on the upper of said supports being flanged downward and the flanges on the lower of said supports being flanged upward, all of said elements being of sheet metal.

8. A sheet metal battery case comprising two ends, a bottom integral with said ends, a plurality of holes therethrough adapted to receive and support storage batteries, all of said elements being of sheet-metal, an acid resistive covering for said sheet metal.

9. A sheet metal battery case comprising two ends, a bottom integral with said ends, battery supporting means having a plurality of holes therethrough adapted to receive and support storage batteries, all of said elements being of sheet metal, and battery terminals in addition to said supporting means for maintaining said batteries in rigid position.

10. A battery case comprising two sheet metal ends, a bottom integral with said ends, sheet metal battery supporting means having a plurality of holes therethrough adapted to receive and support storage batteries, a plurality of terminals situated on and insulated from said supporting means.

11. A battery case comprising two sheet metal ends therefor, a bottom integral with said ends, battery supporting means having a plurality of holes therethrough adapted to receive and support storage batteries therein rigidly mounted between said ends.

12. A battery case comprising two sheet metal ends having flanges, a bottom for said case having flanges, said bottom being integral with said ends, said flanges on said bottom and said flanges on said ends being secured together near the lower corners of said ends, battery supporting means having a plurality of holes therethrough adapted to receive and support storage batteries, said means being secured to said ends for said case at the ends of said means adjacent said ends for the case.

In testimony whereof I have hereunto subscribed my name in the presence of two subscribing witnesses:

JOSEPH H. WHITEHEAD.

Witnesses:
CHARLES A. SILBERMAN,
WM. L. LUESSEN.